United States Patent
Kudo et al.

(10) Patent No.: US 8,304,056 B2
(45) Date of Patent: Nov. 6, 2012

(54) RUBBER STRIP MATERIAL

(75) Inventors: Shigeo Kudo, Osaka (JP); Tetsuo Tatara, Osaka (JP); Osamu Fujiki, Osaka (JP); Mitsuru Hitotsuyanagi, Osaka (JP)

(73) Assignee: Toyo Tire & Rubber Co., Ltd., Osaka-shi, Osaka (JP)

( * ) Notice: Subject to any disclaimer, the term of this patent is extended or adjusted under 35 U.S.C. 154(b) by 2 days.

(21) Appl. No.: 12/307,817

(22) PCT Filed: Jul. 10, 2006

(86) PCT No.: PCT/JP2006/313689
§ 371 (c)(1), (2), (4) Date: Mar. 27, 2009

(87) PCT Pub. No.: WO2008/007420
PCT Pub. Date: Jan. 17, 2008

(65) Prior Publication Data
US 2009/0320985 A1    Dec. 31, 2009

(51) Int. Cl.
*B32B 3/00*     (2006.01)
*B60C 5/02*     (2006.01)
*B60C 5/12*     (2006.01)
*B60C 19/12*    (2006.01)
*B60C 23/00*    (2006.01)
*B29D 30/08*    (2006.01)

(52) U.S. Cl. ........ 428/156; 428/159; 156/117; 156/130; 152/510

(58) Field of Classification Search ............ 428/156, 428/172, 157, 159, 192, 68, 76, 60, 71, 304.4, 428/318.4, 318.6, 318.8, 158; 152/151, 510, 152/DIG. 16; 156/117, 130
See application file for complete search history.

(56) References Cited

U.S. PATENT DOCUMENTS

| | | | | |
|---|---|---|---|---|
| 2,774,120 | A * | 12/1956 | Beare | 49/496.1 |
| 3,654,061 | A * | 4/1972 | Berwanger | 428/157 |
| 6,554,041 | B1 | 4/2003 | Ohki et al. | |
| 2006/0096696 | A1 | 5/2006 | Oku et al. | |
| 2007/0017615 | A1 * | 1/2007 | Nobuchika et al. | 152/152.1 |

FOREIGN PATENT DOCUMENTS
EP  1020284 A2  7/2000
JP  2-212134 A  8/1990
(Continued)

OTHER PUBLICATIONS

International Search Report of PCT/JP2006/313689, Mailing Date of Oct. 10, 2006.

(Continued)

*Primary Examiner* — Catherine A Simone
(74) *Attorney, Agent, or Firm* — Westerman, Hattori, Daniels & Adrian, LLP

(57) ABSTRACT

When forming a rubber member which is made up of a combination of a plurality of rubber compounds by winding spirally a ribbon-shaped unvulcanized rubber strip material in an overlapping fashion, the number of times of winding is reduced so as to shorten a fabrication cycle time of the rubber member to thereby increase the productivity thereof. As a means therefore, a rubber strip material whose cross section is divided into two or more regions which are made up of different rubber compounds is wound spirally on to a drum in an overlapping fashion so as to build a green tire or a tire rubber member.

4 Claims, 13 Drawing Sheets

FOREIGN PATENT DOCUMENTS

| | | |
|---|---|---|
| JP | 09-029858 A | 2/1997 |
| JP | 10323917 A * | 12/1998 |
| JP | 2000-79643 A | 3/2000 |
| JP | 2000-202921 A | 7/2000 |
| JP | 2000-246812 A | 9/2000 |
| JP | 2002-355878 A | 12/2002 |
| JP | 2003-145601 A | 5/2003 |
| JP | 2004-338621 A | 12/2004 |
| JP | 2005-280458 A | 10/2005 |

OTHER PUBLICATIONS

Japanese Office Action mailed Apr. 24, 2012, issued in corresponding Japanese Patent Application No. 2008-524690, w/ partial English translation.

* cited by examiner

000
RUBBER STRIP MATERIAL

TECHNICAL FIELD

The present invention relates to rubber strip materials which are used for fabricating a green tire made up of a plurality of tire rubber members.

BACKGROUND ART

In general, tires are configured in such a manner as to include a plurality of tire rubber members and a plurality of reinforcement members which are mainly made up of cords. In a representative tire, as is shown in FIG. 5, respective portions such as an inner liner rubber portion 1, a tread rubber portion 2, side wall rubber portions 3, rim strip rubber portions 4 and the like are formed by rubber members which match properties required for the respective portions and these rubber members are combined with a carcass layer 5 which constitutes a cord-contained reinforcement member, a belt layer 6 and bead elements 7 to thereby make up a tire T1.

To mold rubber members which make up the respective portions, rubber materials were extruded continuously to be molded into rubber strips from an extruding machine via dies which match cross sectional shapes of the respective rubber members, and thereafter, the rubber strips so molded were cut to constant dimensions to thereby obtain target rubber members. In building a tire, the rubber members were sequentially affixed together on a rotational support element such as a building drum.

However, due to a problem that a rubber strip member distorts or contracts by the rubber strip member being extruded and molded by the extruding machine and cut to a fixed dimension, as is disclosed in Patent Document No. 1 and Patent Document No. 2 below, a non-vulcanized rubber strip material which has been extruded and molded into a ribbon shape is wound in an overlapping fashion in a tire circumferential direction on a rotational support element such as a building drum to thereby form a rubber member having a predetermined cross sectional shape.

Incidentally, in recent years, since tires have been exposed to stringent demands for increased tire performances such as low fuel consumption, increased wear resistance and kinetic performance, reduced noise level and the like, respective rubber members which make up a tire are each combined with a plurality of rubber materials which are suitable for increase in the various tire performances.

For example, since the inner liner rubber portion 1 is a member whose main object is to cut off the permeation of air, a rubber material having a small air permeability is used therefore. However, since the weight of the tire is increased in the event that the thickness of the rubber material is increased, a thin rubber material is preferably provided. However, in the event that a certain degree of thickness is not imparted to the inner liner rubber portion 1, the thickness thereof becomes uneven due to rubber getting out of position during a vulcanization process, leading to a fear that the function of an inner liner to cut of the permeation of air may not be fulfilled. Because of this, there occurs, for example, as is shown in FIG. 6, such a situation that a lower layer 1a of the inner liner rubber portion 1 which is provided on an internal side of a tire is made up of a rubber material having low air permeability, while an upper layer 1b thereof which is provided on an upper surface side of the lower layer 1a which confronts an external side of the tire is made up of a hard rubber member which prevents the movement of the lower layer 1a at the time of building under vulcanization.

The tread portion 2 is highly demanded to exhibit a low rolling resistance due to reduced fuel consumption, and an increase in the so-called wet performance is also demanded which includes braking performance and driving stability on a wet road surface from the viewpoint of safety. Furthermore, superior wear resistance is also demanded from the viewpoint of durability. These respective performances of low rolling resistance, wet performance and wear resistance tend to contradict to one another in view of rubber characteristics, and hence, it is difficult to make those performances compatible with one another. Then, in order to fulfill the various demands described above, for example, as is shown in FIG. 7, a lower layer 2a of the tread rubber portion 2 is made up of a rubber compound having a low rolling resistance, and an intermediate layer 2b which is made up of a rubber compound having an increased wet performance is formed on the lower layer 2a. Furthermore, a surface layer 2c made up of a rubber compound having an increased wear resistance is occasionally provided on the whole area or partially of an upper side thereof.

In addition, the side wall portion 3 needs to relax stress produced in the tread portion during the rotation of the tire, and hence, a high deflection resisting performance and kinetic performance are demanded, and the rubber material at the side wall portion 3 needs to be adaptable to the carcass layer 5 without moving out of position during building under vulcanization. To make this happen, at the side wall portion 3, for example, as is shown in FIG. 8, there may be a case in which a lower layer 3a which is made up of a rubber compound for preventing the movement of the rubber material during building under vulcanization is formed on an internal side of the side wall portion 3 which is brought into contact with the carcass layer 5, a surface layer 3c which is made up of a hard rubber compound is formed on a surface of the side wall portion of the tire T, and an intermediate layer 3b which is interposed between the lower layer 3a and the surface layer 3c is made up of a rubber compound having an increased kinetic performance.

When building the rubber members like the inner liner rubber portion 1, the tread rubber portion 2, and the side wall portion 3 which are each made up of a combination of a plurality of rubber compounds by winding spirally the aforesaid ribbon-shaped unvulcanized rubber strip material in an overlapping fashion, since the winding step needs to be implemented for each of the rubber compounds which make up the rubber member, there is caused a problem that the fabrication cycle time of each rubber member is lengthened to thereby reduce the productivity thereof.

Patent Document No. 1: JP-A-2000-202921
Patent Document No. 2: JP-A-9-29858

DISCLOSURE OF THE INVENTION

Problem that the Invention is to Solve

The invention has been made in view of the problem, and an object thereof is to provide a rubber strip material which can reduce the number of times of winding of a ribbon-shaped unvulcanized rubber strip material so as to shorten a fabrication cycle time of a rubber member made up of a combination of a plurality of rubber compounds when forming the rubber member by spirally winding the rubber strip material in an overlapping fashion.

Means for Solving the Problem

The invention provides a rubber strip material for building a green tire or a tire rubber member by being wound spirally in a tire circumferential direction in a partially overlapping fashion on a rotational support element, characterized in that a cross section of the rubber strip material is divided into two or more regions which are made up of different rubber compounds. In the rubber strip material of the invention, the rubber strip material preferably has a cross sectional shape in which the thickness thereof is gradually reduced from a widthwise central portion towards both sides thereof.

Advantage of the Invention

According to the rubber strip material of the invention, since the rubber strip material is made up of two or more types of rubber compounds and hence two or more types of rubber compounds can be wound in a single winding step, a rubber member made up of a combination of a plurality of rubber compounds can be formed with a reduced number of times of winding, and because of this, the fabrication cycle time of the rubber member can be shortened.

BEST MODE FOR CARRYING OUT THE INVENTION

Next, a first embodiment of the invention will be described in detail based on the drawings.

FIG. 1 shows sectional views of rubber strip materials 10 of the embodiment, and FIG. 2 is a diagram which explains a method for building a rubber member by winding a rubber strip material 10 extruded by an extruding machine 100 for extruding the rubber strip.

In a fabrication process of a tire (a radial tire) T shown in FIG. 5, that is, a tire T made up of a plurality of tire rubber members such as an inner liner rubber portion 1, a tread rubber portion 2, side wall rubber portions 3, rim strip rubber portions 4 and the like, as well as a carcass layer 5 which is a reinforcement member including cords, a belt layer 6, bead elements 7 and the like, a rubber strip material 10 of the embodiment is such as to be used for building at least one of the plurality of rubber members, for example, the inner liner rubber portion 1, the tread rubber portion 2 or the side wall rubber portion 3.

This rubber strip material 10 is formed into a ribbon shape having a flat cross sectional shape such as a substantially crescent shape, a flat substantially triangular shape or a flat substantially trapezoidal shape in which mainly a widthwise central portion is made thickest and the thickness is gradually reduced from this central portion towards both side edges and is made up of two or more types of rubber compounds.

More specifically, for example, the rubber strip material 10 is made up of a first region 12 which is made of a first rubber compound and a second region 14 which is made of a second rubber compound as is shown in FIGS. 1A to 1G, or is made up of a first region 12 which is made of a first rubber compound, a second region 14 which is made of a second rubber compound and a third region 16 which is made of a third rubber compound as is shown in FIG. 1H.

The extruding machine 100 which extrudes the rubber strip material 10 as described above includes, as is shown in FIG. 2, a pair of main body cases 102, 103 which are each formed into a cylindrical shape and in which rubber feeding screw shafts 107, 109 are provided respectively in interiors thereof, a pair of head portions 104, 105 which have gear pumps which are provided consecutively to distal ends of the main body cases 102, 103, respectively, a rubber coalescence portion 106 provided in common at distal ends of the head portions 104, 105 and an extruding die 108 which is added to a distal end of the rubber coalescence portion 106, so that a rubber material Q2 made up of the second rubber compound is made to be supplied into an interior of the main body case 102 from a hopper 110 and a rubber material Q1 made up of the first rubber compound is made to be supplied into an interior of the main body case 103 from a hopper 111. Both the rubber materials Q1, Q2 which are so supplied to the main body cases 102, 103 are fed forwards by virtue of rotation of the screw shafts 107, 109, respectively, and are then fed to the rubber coalescence portion 106 by the gear pumps of the head portions 104, 105 in such a manner as to realize required flow rates. At the rubber coalescence portion 106, the rubber material Q1 and the rubber material Q2 are made to be extruded in such a manner as to match shapes of the first region 12 and the second region 14, respectively, and the rubber strip materials so extruded are then made to be coalesced in such a manner as to be extruded continuously into a ribbon-shaped rubber strip material 10 whose cross section is divided into the first region 12 made of the first rubber compound and the second region 14 made of the second rubber compound as is shown in FIGS. 1A to 1G via an extruding die 108 whose discharge port 108a is formed into a shape which matches the cross sectional shape of the rubber strip material 10.

In addition, when extruding a rubber strip material which is made up of three regions as is shown in FIG. 1H, an extruding machine 100 may be used in which a corresponding number of main body cases and heads to the number of regions which make up the rubber strip material 10 are connected to a rubber coalescence portion 106.

A method will be described for fabricating a tire using the rubber strip material 10 which is extruded in the way described above.

The rubber strip material 10 which is extruded from the extruding machine 100 as is shown in FIG. 2 in the tire fabrication process is wound onto a rotational support element 120 such as a building drum or a green tire (not shown) which is supported at bead portions, so as to build a tire rubber member such as an inner liner rubber portion 1, a tread rubber portion 2, a side wall rubber portion 3 or a rim strip rubber portion 4.

FIG. 2 shows a case in which with the extruding machine 100 installed in such a manner as to confront the rotational support element 120, the rubber strip material 10 which is extruded into the ribbon shape having the predetermined cross sectional shape from the extruding machine 100 is wound directly on to the rotational support element 120 via rolls 114 for introducing the rubber strip material 10 to the rotational support element 120 while shaping properly the cross sectional shape of the rubber strip material 10. The rotational support element 120 can rotate about a shaft 120a, and the rubber strip material 10 is wound along a tire circumferential direction while rotating the rotational support element 120 in a direction indicated by an arrow K in FIG. 2. The rubber strip member 10 which is wound on to the rational support element 120 is pressed against a winding surface 120b of the rotational support element 120 by a roller 116.

FIG. 3 is a view resulting when the rotational support element 120 of the building drum is viewed thereabove, and an arrow A denotes the tire circumferential direction, and an arrow B denotes a tire width direction (axial direction). When winding spirally the rubber strip material 10 along the tire circumferential direction, not only by rotating the rotational support element 120 but also by shifting either the extruding machine 100 or the rotational support element 120 along the tire width direction so as to relatively shift the extruding machine 100 along the tire width direction B. The operations of the extruding machine 100 and the rotational support element 120 are controlled by a control unit 130.

In the example shown in FIG. 3, the rubber strip material 10 is wound while being shifted from the left to the right. A first lap (a first winding) is denoted by M1, a second lap by M2, a third lap by M3, ..., an nth−1 lap by Mn−1 and an nth lap (a final lap) by Mn. Here, winding directions of the first lamp M1 and the nth lap Mn become the same as a direction which intersects the tire width direction at right angles (which is parallel to the tire circumferential direction). Winding directions of the other winding portions of the rubber strip material 10 are inclined through an angle α because the rubber strip material 10 is wound spirally. In addition, the first lap and the final nth lap may be wound in the same direction as the tire circumferential direction by controlling the extruding machine 100 in such a manner as not to be shifted relatively along the tire width direction, whereby an operation of cutting excess portions is made unnecessary.

As is seen from a way of overlapping the rubber strip material 10 in the tire width direction shown in FIG. 4, an inclination angle β of the rubber strip material 10 with respect to the winding surface 120b of the rotational support element 120 can be controlled by controlling an overlapping amount S between the adjacent rubber strip materials 10, 10. In addition, the control of the overlapping amount S between the rubber strip materials 10, 10 can be implemented by controlling the relative shifting speed in the tire width direction between the extruding machine 100 and the rotational support element 120 by the control unit 130.

As has been described above, according to the rubber strip material 10 of the invention, since the rubber strip material 10 is made up of the two or more types of rubber compounds and the two or more types of rubber compounds can be wound in a single winding step, a rubber member made up of a combination of a plurality of rubber compounds can be formed while reducing the number of times of winding, and because of this, the fabrication cycle time of the rubber member can be shortened.

EMBODIMENTS

Next, while embodiments of the invention will be described, the invention is not such as to be limited to the embodiments which will be described below.

Embodiment 1

This embodiment is such that an inner liner rubber portion 1 is built by laminating two types of rubber materials having different air permeabilities, and for example, a lower layer 1a which is provided on an internal side of a tire as is shown in FIG. 6 is made of a rubber material having a low air permeability, and an upper layer 1b which is provided on an upper surface of the lower layer la is made of a hard rubber material which prevents the movement of the lower layer 1a during a vulcanization process.

The inner liner rubber portion 1 which is configured as has been described above is built by feeding a rubber strip material 10a on to the rotational support element 120 for building a tire and winding spirally the rubber strip material 10a so fed on to the rotational support element 120 in the tire circumferential direction A in a partially overlapping fashion (refer to FIG. 2).

A cross section of the rubber strip material 10a is divided into a first region 12a which is made of a first rubber compound which has a low air permeability and a second region 14a which is made of a hard second rubber compound which has a higher air permeability than that of the first rubber compound and which prevents the movement of rubber during a vulcanization process, and the first region 12a is provided wider than the second region 14a. As a specific example of a rubber strip material 10a like this, rubber strip materials 10a shown in FIGS. 9A to 9F will be raised.

For example, when building an inner liner rubber portion 1 by the use of a rubber strip material 10a shown in FIG. 9A, since the rubber strip material 10a is such that a first region 12a is provided wider than a second region 14a, by the rubber strip material 10a being pressed against the winding surface 120b of the rotational support element 120 by the roller 116, first regions 12a, 12a of the adjacent rubber strip materials 10a, 10a are brought into contact with each other as is shown in FIG. 10A.

By this action, in an inner liner rubber portion 1 built on the winding surface 120b of the rotational support element 120, a lower layer 1a which is made of the first rubber compound having the low air permeability is formed on the winding surface 120b, and an upper layer 1b which is made of the hard second rubber compound and which prevents the movement of the rubber material during a vulcanization process is formed on an upper surface of the lower layer 1a, whereby the inner liner rubber portion 1 which is made by laminating the two types of rubber compounds having the different air permeabilities one on the other can be built through a single winding step.

In addition, in the case of rubber strip materials 10a as is shown in FIGS. 9B to 9E, an inner liner rubber portion 1 which is made by laminating the two types of rubber compounds having the different air permeabilities one on the other can be built through a single winding step. In particular, with the rubber strip materials 10a shown in FIGS. 9B and 9C, since first regions 12a, 12a of adjacent rubber strip materials 10a, 10a can be brought into contact with each other by winding spirally the rubber strip material 10a in a partially overlapping fashion as is shown in FIG. 10B, a portion where the continuity of the layer of the rubber material having the low air permeability is interrupted is made difficult to occur, whereby the inner liner rubber portion 1 having a high air barrier property can be built in an ensured fashion.

In addition, since the inner liner rubber portion 1 is a member whose main object is to cut off the permeability of air, a rubber strip material 10a as is shown in FIG. 1F may be adopted in which the whole surface of the rub strip material 10a is defined by a first region 12 which is made of the first rubber compound having the low air permeability, whereby the inner liner rubber portion 1 having the high air barrier property can be built while suppressing the using amount of the rubber material having the small air permeability.

In this embodiment, since the inner liner rubber portion 1 which is made by laminating the two types of rubber material having the different air permeabilities can be built through the single winding step, the fabrication cycle time of the inner liner rubber portion 1 can be shortened.

Embodiment 2

This embodiment is such that a tread rubber portion 2 is built which is made by laminating three types of rubber compounds in a thickness direction, and for example, as is shown in FIG. 7, a lower layer 2a of a tread rubber portion 2 which contacts a belt layer 6 is made up of a rubber compound having a low rolling resistance, an intermediate layer 2b made up of a rubber compound having an increased wet performance is formed on an upper surface of the lower layer 2a, and a surface layer 2c made up of a rubber compound having an increased wear resistance is provided over a whole area of an upper surface of the intermediate layer 2b. A boundary 2d separating the lower layer 2a from the intermediate layer 2b is provided substantially parallel to a lower layer 2a side surface and a boundary 2e separating the intermediate layer 2b and the surface layer 2c is provided substantially parallel to a surface layer 2c side surface on which a recess is provided at a tire widthwise central portion.

The tread rubber portion 2 configured as described above is built by feeding two types of rubber strip materials 10b, 10c on to the rotational support element 120 for building a tire and winding spirally the rubber strips 10b, 10c so fed on to the rotational support element 120 in a partially overlapping fashion (refer to FIG. 2).

Specifically, firstly, as is shown in FIG. 11A, a ribbon-shaped first rubber strip material 10b whose cross section is divided into a first region 12b which is made up of a first rubber compound having a low rolling resistance and a second region 14b which is made up of a second rubber compound having an increased wet performance is fed onto the rotational support element 120 and is then wound spirally on to the rotational support element 120 in a partially overlapping fashion.

As this occurs, as is shown in FIG. 12, the first rubber strip material 10b is wound on to the winding surface 120b of the rotational support element 120 in an overlapping fashion in such a state that the first rubber strip material 10b is inclined a predetermined angle β1 relative to the winding surface 120b of the rotational support element 120 in such a manner that a boundary 13b which separates the first region 12b from the second region 14b of the first rubber strip material 10b coincides with a boundary 2d which separates a lower layer portion 2a from an intermediate layer 2b. In addition, the cross section of the first rubber strip material 10b is formed into a flat shape (in this embodiment, a substantially crescent shape) in which the thickness of the first rubber strip material 10b is reduced gradually from a central portion towards both side edges thereof, the inclination angle of the first rubber strip material 10b relative to the winding surface 120b of the rotational support element 120 can be increased by increasing the overlapping amount of the adjacent rubber strip materials 10b, whereby the inclination angle can freely be changed within a range of 0 degree to 90 degrees by controlling the overlapping amount of the first rubber strip material 10b.

Following this, a ribbon-shaped second rubber strip material 10c whose cross section is divided into a first region 12c which is made up of a first rubber compound having an increased wet performance and a second region 14c which is made up of a second rubber compound having an increased wear resistance is fed on to the rotational support element 120 on which a first rubber strip material 10b has been wound in the overlapping fashion in the way described above and is then wound spirally thereonto in a partially overlapping fashion.

As this occurs, as is shown in FIG. 12, the second rubber strip material 10c is wound on to the winding surface 120b of the rotational support element 120 in the overlapping fashion in such a state that the second rubber strip material 10c is inclined a predetermined angle relative to the winding surface 120b of the rotational support element 120 in such a manner that a boundary 13c which separates the first region 12c from the second region 14c of the second rubber strip material 10c coincides with a boundary 2e which separates an intermediate layer 2b from a surface layer 2c. In this embodiment, a recessed portion 2f is provided at a central portion in the tire width direction of the boundary 2e which separates the intermediate layer 2b from the surface layer 2c. Because of this, at the beginning of winding, the second rubber strip material 10c is wound in the overlapping fashion with an inclination angle of the second rubber strip material 10c set to $\beta_2$ relative to the winding surface 120b, the recessed portion 2f provided at the central portion in the tire width direction is formed with the inclination angle of the second rubber strip material 10c changed to an angle $\beta_3$ which is smaller than $\beta_2$ from the midst of winding, and thereafter, the second rubber strip material 10c continues to be wound with the inclination angle of the second rubber strip material 10c changed back to $\beta_2$, again.

As has been described above, in this embodiment, the tread rubber portion 2 which is made by laminating the three types of rubber compounds including the rubber compound having the low rolling resistance, the rubber compound having the increased wet performance and the rubber compound having the increased wear resistance one on another can be built through the winding steps of the two types of rubber strip materials 10b, 10c, thereby making it possible to shorten the fabrication cycle time of the tread rubber portion 2.

Next, as a modified example to the embodiment, a case will be described in which a tread rubber portion 2 as shown in FIG. 7B is built. A tread rubber portion 2 according to the modified example differs from Embodiment 2 in which the surface layer 2c made up of the rubber compound having the increased wear resistance is provided over the whole area of the upper surface of the intermediate layer 2b in that a surface layer 2c made up of the rubber compound having the increased wear resistance is provided at shoulder portions which correspond to both side portions in the tire width direction.

In the tread rubber portion 2 configured as has been described above, firstly, as is shown in FIG. 11C, a ribbon-shaped first rubber strip material 10d made up of the rubber compound having the low rolling resistance is fed on to the rotational support element 120 and is then wound spirally in an overlapping fashion, whereby a lower layer 2a of the tread rubber portion 2 is formed as is shown in FIG. 13.

Following this, a ribbon-shaped second rubber strip material 10e whose cross section is divided into a first region 12e which is made up of a first rubber compound having an increased wet performance as is shown in FIG. 11D and a second region 14e which is made up of a second rubber compound having an increased wear resistance and a ribbon-shaped third rubber strip material 10f which is made up of a rubber compound having an increased wet performance as is shown in FIG. 11E are fed to the rotational support element 120 on which the first rubber strip material 10d is wound in an overlapping fashion and are then wound spirally in an overlapping fashion, whereby an intermediate layer 2b and shoulder portions 2c are formed.

More specifically, firstly, the second rubber strip material 10e which has been extruded from an extruding machine 100 as is shown in FIG. 2 is wound spirally in a partially overlapping fashion from one side end portion (for example, a left end portion in FIG. 13) of the lower layer 2a of the tread rubber portion formed on the rotational support element 120 with the second rubber strip material 10e inclined a predetermined angle relative to the winding surface 120b of the rotational support element 120 in such a manner that a boundary 13e which separates the first region 12e from the second region 14e coincides with a boundary 2e which separates an intermediate layer 2b from a surface layer 2c. In this way, the intermediate layer 2b and the shoulder portion 2c are formed which are positioned on one side (for example, a left-hand side) in the tire width direction.

As this occurs, in the extruding machine 100, by controlling the screw shaft 107 in the main body case into which a rubber material Q2 made up of the second rubber compound is supplied and the gear pump 104 and the screw shaft 109 in the main body case into which a rubber material Q1 made up of the first rubber compound is supplied and the gear pump 105 individually, the rubber materials Q1, Q2 are fed to the rubber coalescence portion 106 at predetermined flow rates, whereby the second rubber strip material 10e is extruded to be fed to the rotational support element 120.

In addition, the inclination angle of the second rubber strip material 10e relative to the winding surface 120b is controlled in the same way as described above by controlling the overlapping amount of the second rubber strip material 10e.

Following this, from the midst of the winding operation of the second rubber strip material 10e, the operations of the screw shaft 107 in the main body case into which the rubber material Q2 is supplied and the gear pump 104 of the extruding machine 100 are stopped, while the screw shaft 109 in the other main body case 103 into which the rubber material Q1 is supplied and the gear pump 105 are controlled in such a manner that the flow rate of the rubber material fed to the rubber coalescence portion 106 becomes a predetermined one. Since the drawing is an exaggerated enlarged drawing, even though the second region 14e is reduced gradually due to a residual pressure in the gear pump 104, there will be caused no problem with the tire performance. By controlling the extruding machine 100 in the way described above, the third rubber strip material 10f is extruded from the extruding machine 100, and by winding spirally the third rubber strip material 10f so extruded on to the rotational support element 120 in a partially overlapping fashion, the intermediate layer 2b which is disposed in the tire width direction is formed.

Following this, from the midst of the winding operation of the third rubber strip material 10f, the screw shaft 107 in the main body case 104 and the gear pump 104 of the extruding machine 100 which have been stopped from rotating are caused to rotate at predetermined speeds, while the rotational speeds of the screw shaft 109 in the other main body case 103 into which the rubber material Q1 made up of the first rubber compound is supplied and the gear pump 105 are controlled to be reduced in such a manner that the flow rate of the rubber material fed to the rubber coalescence portion 106 becomes the predetermined one. By controlling the extruding machine 100 in the way described above, the second rubber strip material 10e is extruded from the extruding machine 100 so as to be fed to the rotational support element 120.

By controlling the inclination angle of the second rubber strip material 10e relative to the winding surface 120b by controlling the overlapping amount thereof with an adjacent rubber strip material 10e, the second rubber strip material 10e is wound spirally on to the rotational support element 120 in a partially overlapping fashion in such a manner that the boundary 13e which separates the first region 12e from the second region 14e coincides with the boundary 2e which separates the intermediate layer 2b from the surface layer 2c, whereby the intermediate layer 2b and the shoulder portion 2c are formed which are positioned on the other side (for example, on a right-hand side) in the tire width direction.

In this way, the tread rubber portion 2 is formed which includes the lower layer 2a made up of the rubber compound having the low rolling resistance, the intermediate layer 2b which is made up of the rubber compound having the increased wet performance and is formed on the upper surface of the lower layer 2a and the surface layers 2c which are each made up of the rubber compound having the increased wear resistance and are formed on the upper surface of the intermediate layer 2b and at the shoulder portions which correspond to both the side portions in the tire width direction.

In this modified example, by controlling the flow rates of the rubber materials Q1, Q2 which are fed to the rubber coalescence portion 106 of the extruding machine 100, the rubber strip material which is extruded from the extruding machine 100 can be switched between the second rubber strip material 10e and the third rubber strip material 10f from the midst of the winding step without stopping the rotational operation of the rotational support element 120, and the intermediate layer 2b and the surface layers 2c which are formed on the upper surface of the lower layer 2a of the tread rubber portion 2 can be built through the single winding step. Consequently, in this modified example, the tread rubber portion 2 which is made by laminating the three types of rubber compounds including the rubber compound having the low rolling resistance, the rubber compound having the increased wet performance and the rubber compound having the increased wear resistance can be built by the two winding steps including the winding step for forming the lower layer 2a and the winding step for forming the intermediate layer 2b and the surface layers 2c, thereby making it possible to shorten the fabrication cycle time of the tread rubber portion 2.

Moreover, since the rubber strip material extruded from the extruding machine 100 can be switched between the second rubber strip material 10e and the third rubber strip material 10f at an arbitrary timing in the midst of the winding steps, the surface layer 2c can be disposed at arbitrary positions in the tire width direction such as both the side portions in the tire width direction, thereby making it possible to deal with a design change in tire construction in a flexible fashion.

Embodiment 3

This embodiment is such that a side wall portion 3 is built by laminating three types of rubber compounds in a thickness direction, and for example, as is shown in FIG. 8, a lower layer 3a which is made up of a first rubber compound which prevents the movement of a rubber material at the time of vulcanization is formed on an internal side of a side wall portion 3 which contacts a carcass layer 5 of a tire T, a surface layer 3c which is made up of a third rubber compound having a high degree of hardness is formed on a surface of a side wall portion 3, and an intermediate layer 3b which is made up of a second rubber compound with an increased maneuverability is provided between the lower layer 3a and the surface layer 3c.

The side wall portion 3 configured as described above is built, as is shown in FIG. 14, by feeding a ribbon-shaped first rubber strip material 10g whose cross section is divided into a first region 12g which is made up of the first rubber compound which prevents the movement of a rubber material at the time of vulcanization, a second region 14g which is made up of the second rubber compound having the increased maneuverability and a third region 16g which is made up of the highly hard third rubber compound having an increased wear resistance on to the rotational support element of a green tire (not shown) which is supported at bead portions and then winding the first rubber strip material 10g so fed spirally in the tire circumferential direction B in a partially overlapping fashion (refer to FIG. 2).

Specifically, as is shown in FIG. 14, the side wall portion 3 can be built by winding the first rubber strip material 10g on to the winding surface in such a state that the first rubber strip material 10g is inclined a predetermined angle $\beta_4$ relative to the winding surface in an overlapping fashion in such a manner that a boundary 13g which separates the first region 12g from the second region 14g of the first rubber strip material 10g coincides with a boundary 3d which separates a lower layer 3a from an intermediate layer 3b in FIG. 15 and a boundary 15g which separates the second region 14g from the third region 16g coincides with a boundary 3e which separates the intermediate layer 3b from a surface layer 3c.

As has been described heretofore, in this embodiment, the side wall portion 3 can be built which is made by laminating the three types of rubber compounds which includes the rubber compound which prevents the movement of the rubber material at the time of vulcanization, the second rubber compounds having the increased maneuverability and the highly hard rubber compound having the increased wear resistance, thereby making it possible to shorten the fabrication cycle time of the side wall portion 3.

DESCRIPTION OF REFERENCE NUMERALS

Figure 1A:
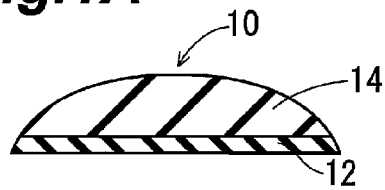
FIG. 1A~FIG. 1H Sectional views of rubber strip materials according to an embodiment of the invention.
Figure 1E:
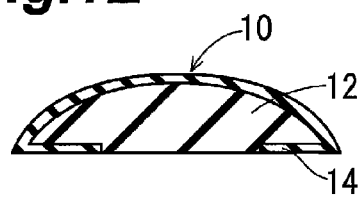
Figure 1B:
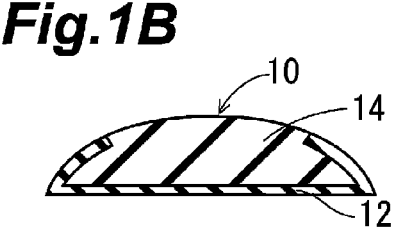
Figure 1F:
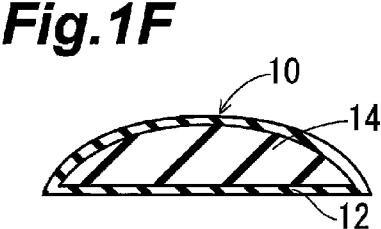
Figure 1C:
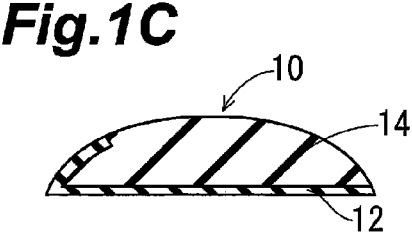
Figure 1G:
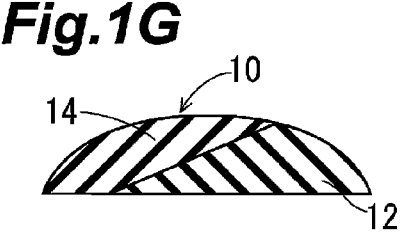
Figure 1D:
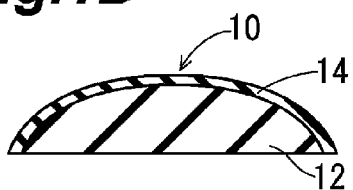
Figure 1H:
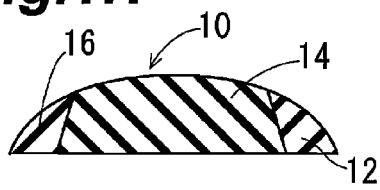
Figure 2:
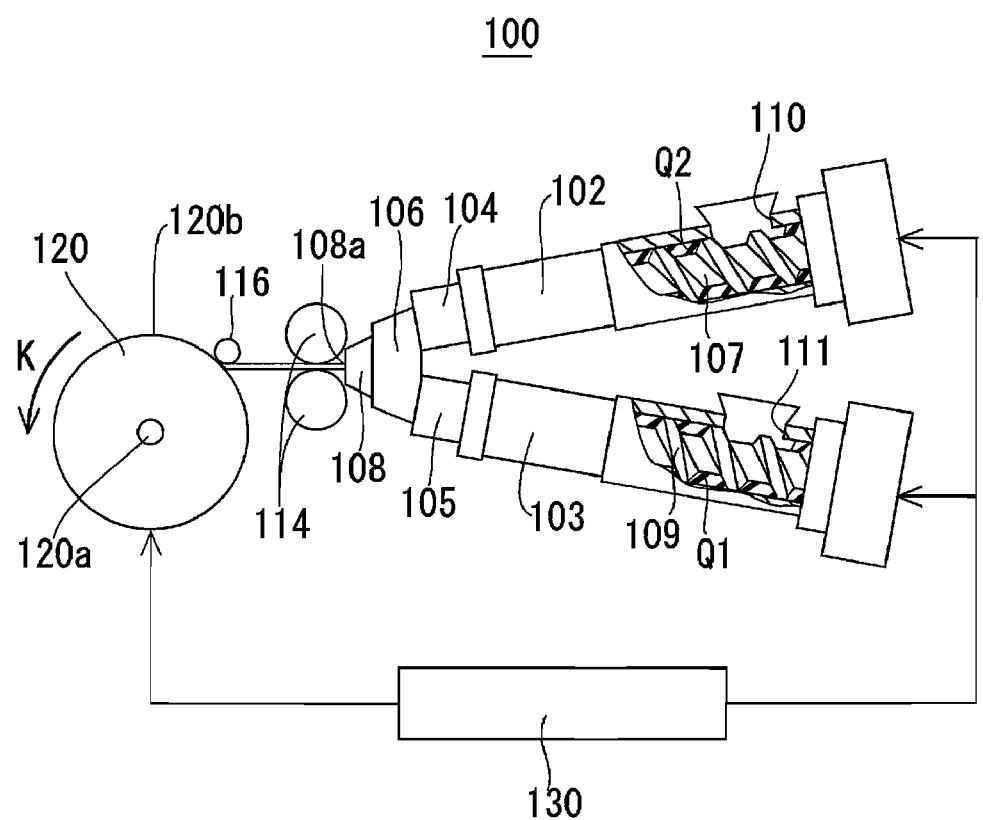
FIG. 2 An exemplary drawing which explains a method for building a tire rubber member by a rubber strip material according to the embodiment of the invention.
Figure 3:
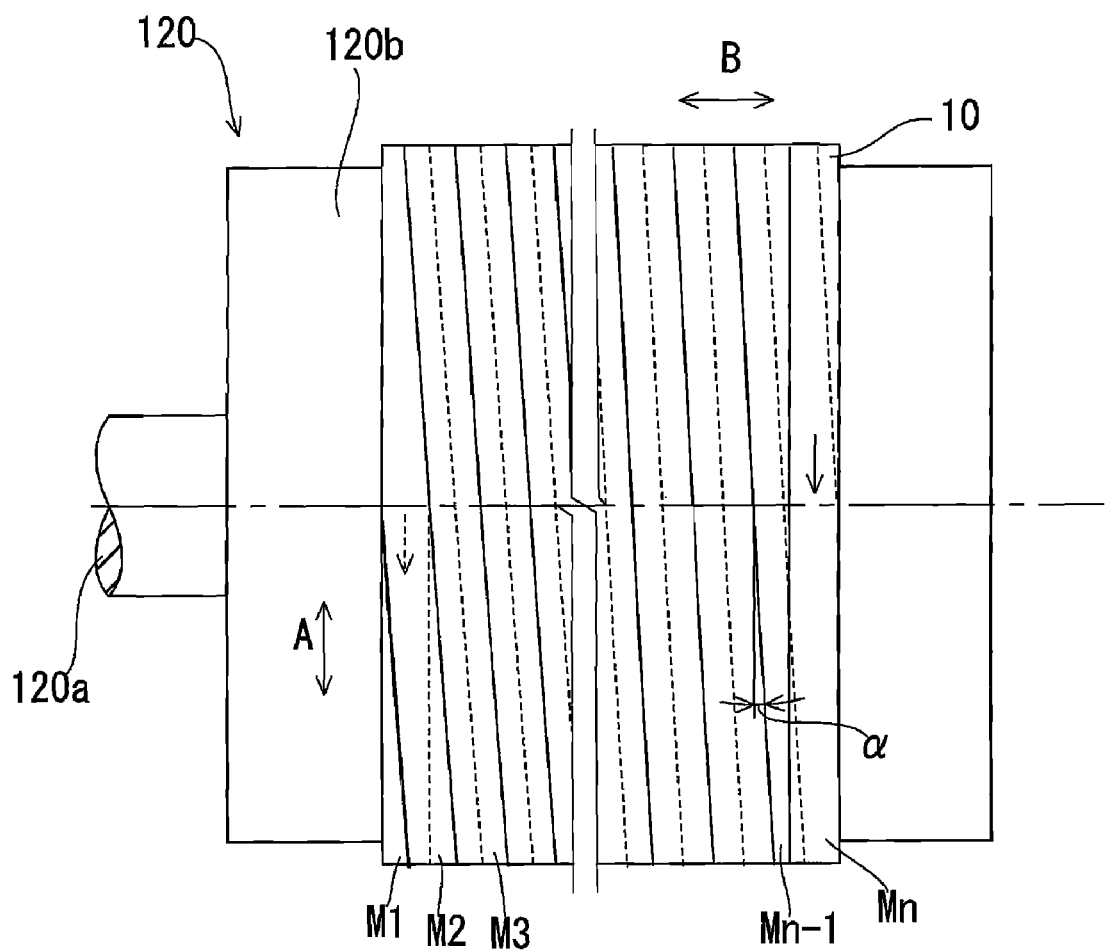
FIG. 3 An exemplary drawing which explains the method for building the tire rubber member by the rubber strip material according to the embodiment of the invention.
Figure 4:
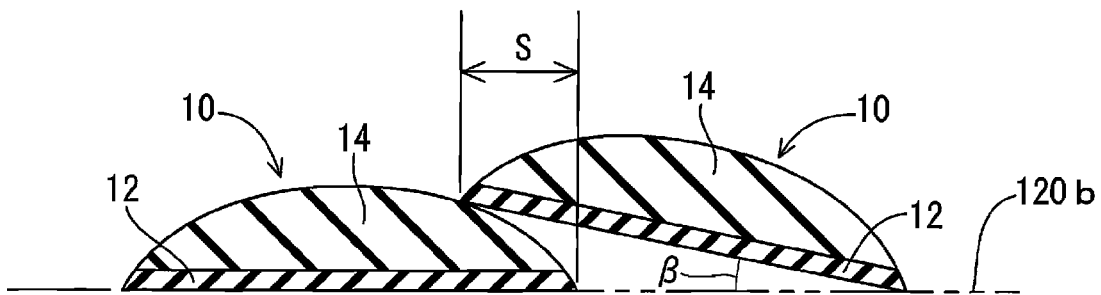
FIG. 4 A sectional view which explains a way of overlapping the rubber strip material.
Figure 5:
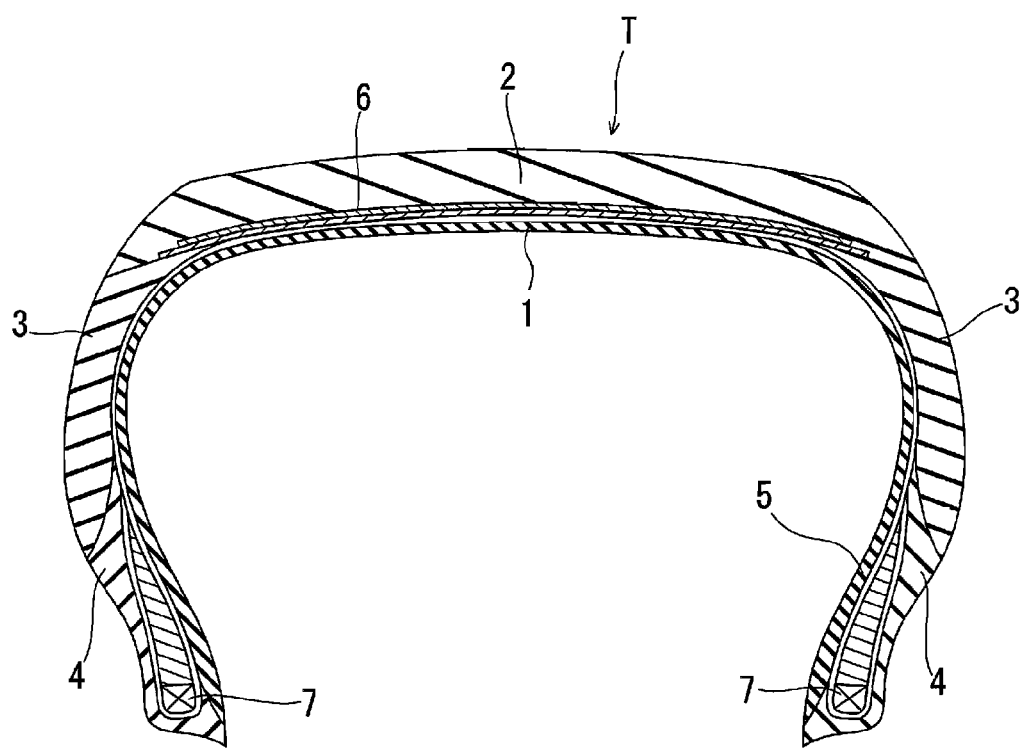
FIG. 5 A sectional view which explains the construction of a tire.
Figure 6:
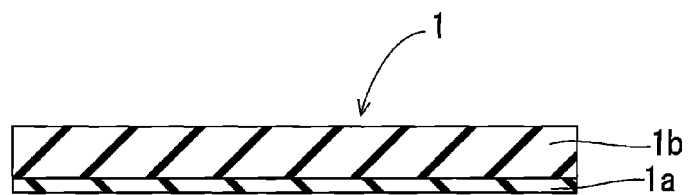
FIG. 6 A sectional view which explains the construction of an inner liner rubber portion.
Figure 7A:
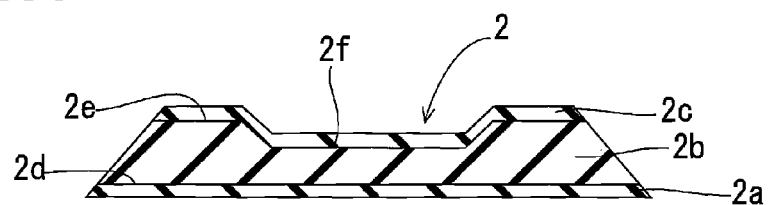
FIG. 7A, FIG. 7B Sectional views which explain the constructions of tread portions.
Figure 7B:
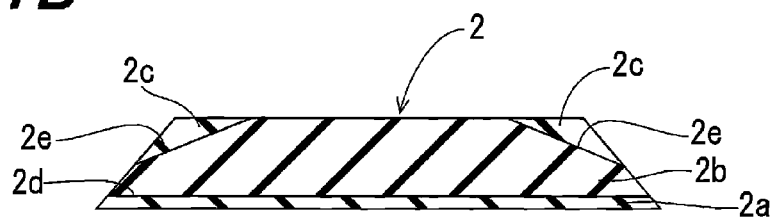
Figure 8:
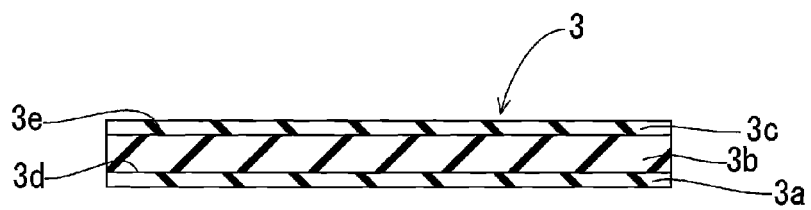
FIG. 8 A sectional view which explains the construction of a side wall portion.
Figure 9A:
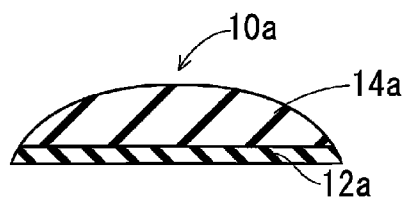
FIG. 9A~FIG. 9F Sectional views of rubber strip materials according to a first embodiment of the invention.
Figure 9D:
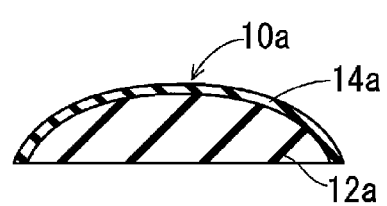
Figure 9B:
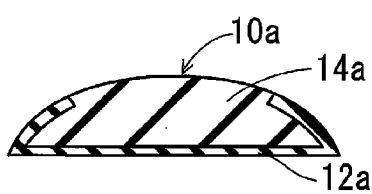
Figure 9E:
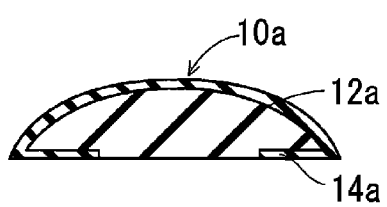
Figure 9C:
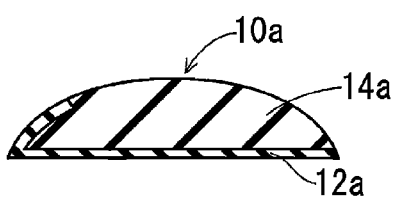
Figure 9F:
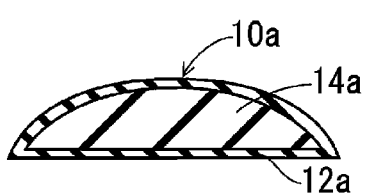
Figure 10A:
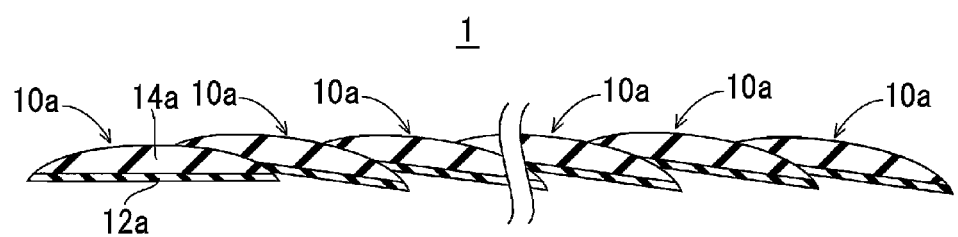
FIG. 10A, FIG. 10B Sectional views which explain ways of building an inner liner rubber portion using the rubber strip materials according to the first embodiment of the invention.
Figure 10B:
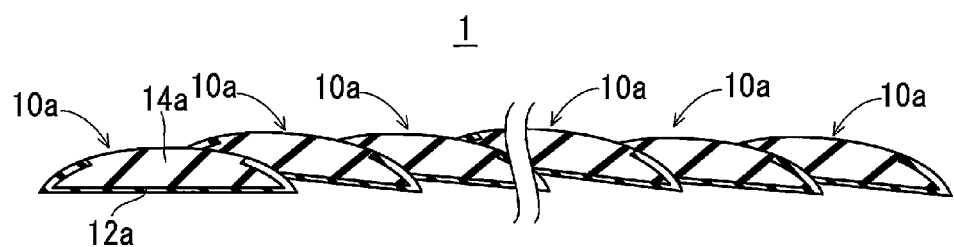
Figure 11A:
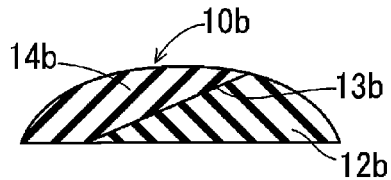
FIG. 11A, FIG. 11B Sectional views of rubber strip materials according to a second embodiment of the invention.
Figure 11B:
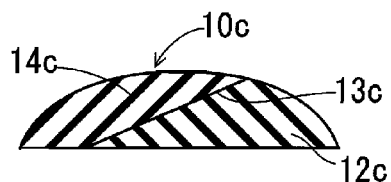
Figure 11C:
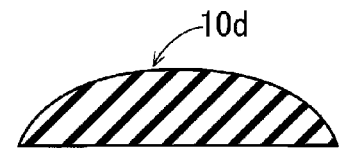
FIG. 11c~FIG. 11e Sectional views of rubber strip materials according to a modified example to the second embodiment of the invention.
Figure 11D:
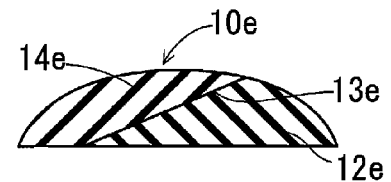
Figure 11E:
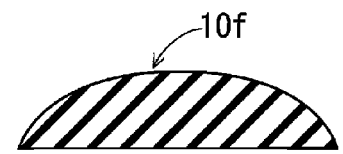
Figure 12:
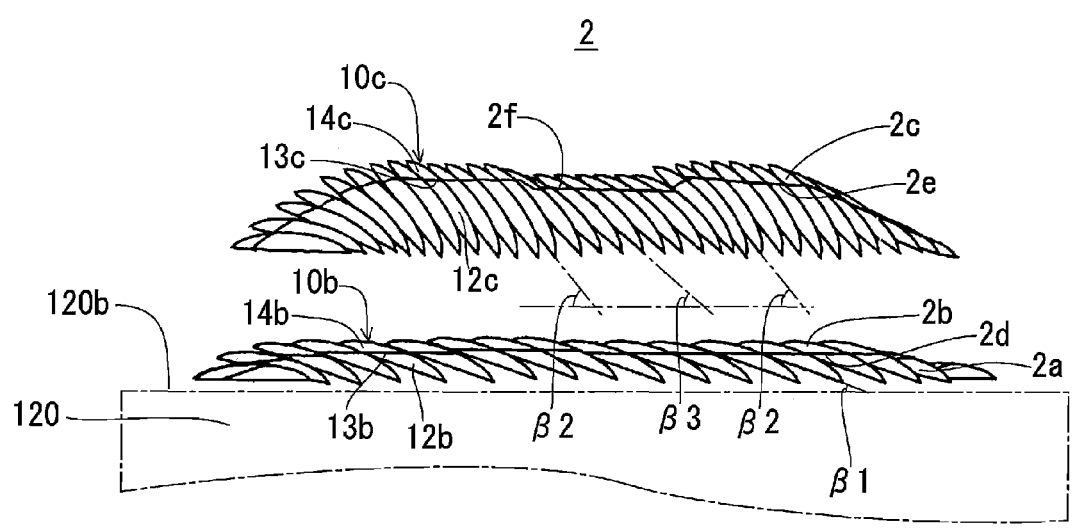
FIG. 12 A sectional view showing a method for building a tread portion using the rubber strip materials according to the second embodiment of the invention.
Figure 13:
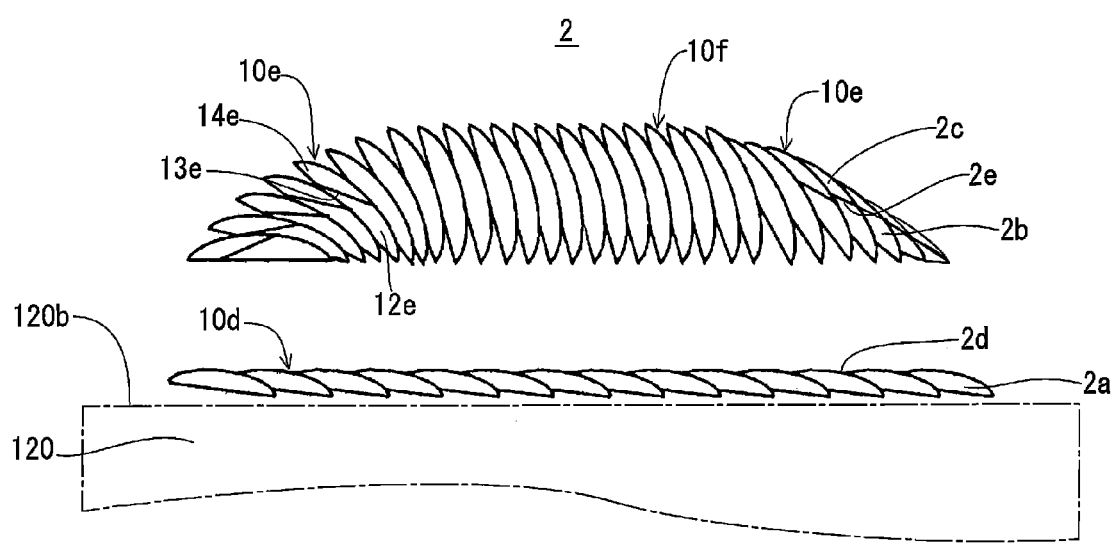
FIG. 13 A sectional view showing a method for building a tread portion using the rubber strip materials according to the modified example to the second embodiment of the invention.
Figure 14:
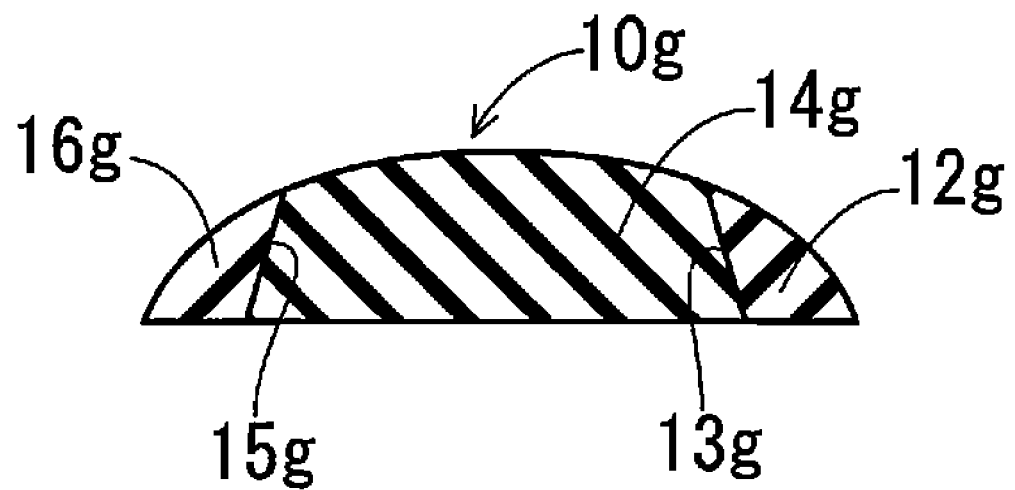
FIG. 14 A sectional view of a rubber strip material according to a third embodiment of the invention.
Figure 15:
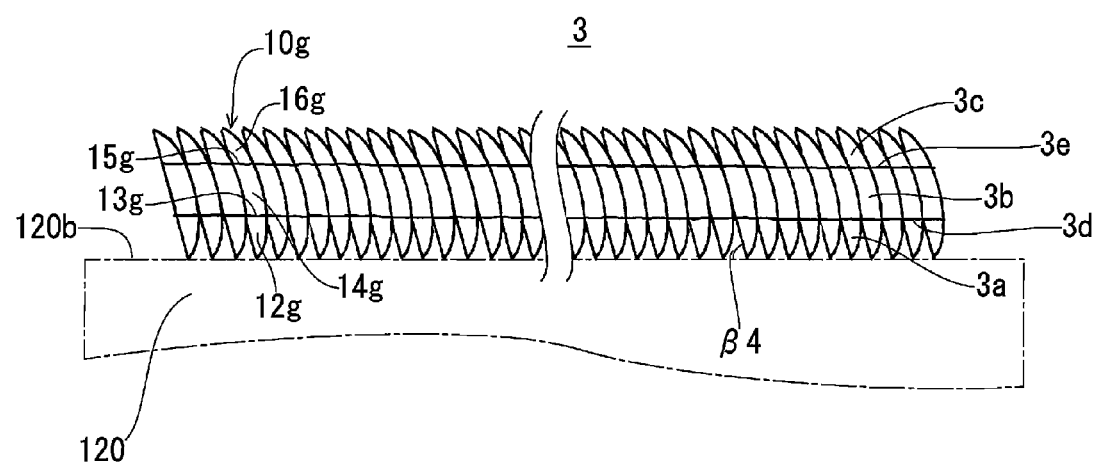
FIG. 15 A sectional view showing a method for building a side wall portion using the rubber strip material according to the third embodiment of the invention.

1 . . . inner liner rubber portion
2 . . . tread rubber portion
3 . . . side wall rubber portion
4 . . . rim strip rubber portion
5 . . . carcass layer
6 . . . belt
10, 10a, 10b, 10c, 10d, 10e, 10f, 10g . . . rubber strip material
12, 12a, 12b, 12c, 12e, 12g . . . first area
14, 14a, 14b, 14c, 14e, 14g . . . second region
16, 16g . . . third region
100 . . . extruding machine
102, 103 . . . main body case
104, 105 . . . head portion
106 . . . rubber coalescence portion
107 . . . screw
108 . . . extruding die
108a . . . discharge port
109 . . . screw
110, 111 . . . hopper
114 . . . roll
116 . . . roller
120 . . . rotational support element
120a . . . rotational shaft
120b . . . winding surface
130 . . . control unit

The invention claimed is:

1. A rubber strip material for building a green tire or a tire rubber member by being wound spirally in a tire circumferential direction in a partially overlapping fashion on a rotational support element, comprising:
   a first rubber compound, and
   a second rubber compound,
   wherein in cross section, the rubber strip material is divided into a first region made up of said first rubber compound and a second region made up of said second rubber compound,
   wherein said first region is wider than said second region,
   wherein said first rubber compound has a lower air permeability than said second rubber compound, and
   wherein a cross-sectional shape of said rubber strip material is a flat substantially crescent shape, a flat substantially triangular shape or a flat substantially trapezoidal shape.

2. The rubber strip material as set forth in claim 1, wherein the cross-sectional shape of said rubber strip material has a thickness which is gradually reduced from a widthwise central portion towards both sides thereof.

3. A method of fabricating a green tire, comprising:
   spirally winding a rubber strip material in a tire circumferential direction in a partially overlapping fashion on a rotational support element,
   wherein said rubber strip material comprises
   a first rubber compound, and
   a second rubber compound,
   wherein in cross section, the rubber strip material is divided into a first region made up of said first rubber compound and a second region made up of said second rubber compound,
   wherein said first region is wider than said second region,
   wherein said first rubber compound has a lower air permeability than said second rubber compound, and
   wherein a cross-sectional shape of said rubber strip material is a flat substantially crescent shape, a flat substantially triangular shape or a flat substantially trapezoidal shape.

4. The method as set forth in claim 3, wherein the cross-sectional shape of said rubber strip material has a thickness which is gradually reduced from a widthwise central portion towards both sides thereof.

* * * * *